US012665334B2

(12) United States Patent
Durse et al.

(10) Patent No.: US 12,665,334 B2
(45) Date of Patent: Jun. 23, 2026

(54) HIGH VOLTAGE (HV) TERMINAL FRAME

(71) Applicant: Aptiv Technologies AG, Schaffhausen (CH)

(72) Inventors: Nicholas A. Durse, Youngstown, OH (US); Don E. Bizon, Boardman, OH (US); William C. Lovitz, Niles, OH (US); Michael L. Mellott, Youngstown, OH (US)

(73) Assignee: Aptiv Technologies AG, Schaffhausen (CH)

( * ) Notice: Subject to any disclaimer, the term of this patent is extended or adjusted under 35 U.S.C. 154(b) by 0 days.

(21) Appl. No.: 18/755,320

(22) Filed: Jun. 26, 2024

(65) Prior Publication Data

US 2024/0347946 A1 Oct. 17, 2024

Related U.S. Application Data

(62) Division of application No. 17/741,938, filed on May 11, 2022, now abandoned.

(60) Provisional application No. 63/195,785, filed on Jun. 2, 2021, provisional application No. 63/187,588, filed on May 12, 2021.

(51) Int. Cl.
*H01R 13/11* (2006.01)
*H01R 13/03* (2006.01)

(52) U.S. Cl.
CPC .............. *H01R 13/11* (2013.01); *H01R 13/03* (2013.01)

(58) Field of Classification Search
CPC ........ H01R 13/11; H01R 13/10; H01R 13/08; H01R 13/05; H01R 13/005; H01R 13/03
See application file for complete search history.

(56) References Cited

U.S. PATENT DOCUMENTS

| | | | |
|---|---|---|---|
| 5,431,576 | A | 7/1995 | Matthews |
| 5,575,696 | A | 11/1996 | Endo et al. |
| 5,588,884 | A | 12/1996 | Rudoy et al. |
| 7,601,019 | B2 | 10/2009 | Hsieh et al. |
| 8,388,389 | B2 | 3/2013 | Costello et al. |
| 9,318,829 | B2 | 4/2016 | Yu et al. |
| 9,627,790 | B2 | 4/2017 | Anderson et al. |
| 10,050,395 | B2 | 8/2018 | Ngo et al. |
| 10,116,078 | B1 | 10/2018 | Durse et al. |

(Continued)

FOREIGN PATENT DOCUMENTS

| | | | |
|---|---|---|---|
| CN | 2399842 | Y | 10/2000 |
| CN | 101944692 | A | 1/2011 |

(Continued)

OTHER PUBLICATIONS

"Extended European Search Report Received mailed on Jan. 23, 2023", 18 pages.

(Continued)

*Primary Examiner* — Harshad C Patel
(74) *Attorney, Agent, or Firm* — Billion & Armitage

(57) ABSTRACT

A two-piece high voltage (HV) terminal frame having a terminal frame and a contact spring. The terminal frame includes at least a top portion, a bottom portion, and a middle portion forming an opening for receiving a first bus bar and a second bus bar. The contact spring is configured to engage the top portion of the terminal frame, wherein the contact spring includes a spring portion that extends into the opening of the terminal frame.

17 Claims, 6 Drawing Sheets

(56) References Cited

U.S. PATENT DOCUMENTS

| | | | | |
|---|---|---|---|---|
| 10,164,365 | B2 | 12/2018 | Hashiguchi | |
| 10,389,055 | B1 * | 8/2019 | Lui | H01R 13/187 |
| 10,454,199 | B1 | 10/2019 | Christiano et al. | |
| 10,454,209 | B2 * | 10/2019 | Holub | H01R 13/6275 |
| 10,855,025 | B2 * | 12/2020 | Holub | H01R 43/26 |
| 10,916,872 | B2 | 2/2021 | Kojima et al. | |
| 11,264,752 | B1 * | 3/2022 | Durse | H01R 13/115 |
| 11,437,688 | B2 | 9/2022 | Fabre et al. | |
| 11,811,159 | B2 | 11/2023 | Chen | |
| 11,824,297 | B2 | 11/2023 | Yang | |
| 2009/0047814 | A1 | 2/2009 | Daamen | |
| 2011/0073364 | A1 | 3/2011 | Reibke | |
| 2014/0158395 | A1 | 6/2014 | Billman et al. | |
| 2014/0302702 | A1 * | 10/2014 | Germ | H01R 13/639 439/370 |

FOREIGN PATENT DOCUMENTS

| | | | |
|---|---|---|---|
| CN | 103222131 | A | 7/2013 |
| EP | 2790273 | B1 | 12/2020 |
| EP | 3996212 | A1 | 5/2022 |
| GB | 781606 | A | 8/1957 |
| JP | H10241813 | A | 9/1998 |
| WO | 2007025677 | A2 | 3/2007 |
| WO | 2021085542 | A1 | 5/2021 |

OTHER PUBLICATIONS

"Partial European Search Report for EP Application No. 22173082.3", Oct. 6, 2022, 15 pages.

"Communication Pursuant to Article 94(3) EPC mailed on Feb. 26, 2025", 9 Pages.

"Chinese Office Action for Application No. 202210517650.8; mailed on May 15 2025", 17 Pages.

"Second Office Action for CN Application No. 202210517650.8; mailed on Nov. 13, 2025", 13 Pages.

"Notice of Decision to Grant for CN Application No. 202210517650.8; mailed on Apr. 9, 2026", 7 Pages.

* cited by examiner

HIGH VOLTAGE (HV) TERMINAL FRAME

CROSS-REFERENCE TO RELATED APPLICATION(S)

This patent application is a divisional application of U.S. application Ser. No. 17/741,938, filed May 11, 2022, which claims the benefit of U.S. Provisional Application No. 63/187,588, filed May 12, 2021 and U.S. Provisional Application No. 63/195,785 filed Jun. 2, 2021, both of which are incorporated by reference in their entirety.

BACKGROUND

The present disclosure is directed to a high voltage terminal frame and in particular to a two-piece high voltage terminal frame.

High voltage terminal frames include a rigid outer housing and a more compliant contact spring. Typically, the rigid outer housing is separate from the more compliant contact spring, made of different materials, and requiring assembly at manufacture. This type of HV frame is a two-piece assembly. In some embodiments, a conductive bus bar is crimped to the rigid outer housing, resulting in a three-piece assembly. It would be beneficial to develop a high voltage terminal frame that provides the same functionality but that does not require separate components for the rigid outer housing and the more compliant contact spring.

SUMMARY OF THE INVENTION

According to one aspect, a two-piece high voltage (HV) terminal frame includes a terminal frame and a contact spring. The terminal frame includes at least a top portion, a bottom portion, and a middle portion forming an opening for receiving a first bus bar and a second bus bar. The contact spring is configured to engage the top portion of the terminal frame, wherein the contact spring includes a spring portion that extends into the opening of the terminal frame.

According to another aspect, a header assembly includes a housing assembly, a two-piece terminal assembly, and a terminal position assurance (TPA). The housing assembly includes at least a first opening for receiving a bus bar. The two-piece terminal assembly includes a terminal frame and a contact spring engaged with the terminal frame, wherein the two-piece terminal assembly is positioned within the housing assembly. The terminal position assurance (TPA) positioned within the housing assembly adjacent to the two-piece terminal assembly.

DETAILED DESCRIPTION

According to some aspects, the present invention is directed to a high voltage (HV) terminal assembly. In some embodiments, the HV terminal assembly is a two-part assembly that includes a terminal frame and a spring contact, wherein the spring contact is configured to engage with the terminal frame. In some embodiments, the terminal frame is fabricated from a first piece of material (e.g., stainless steel) having a first thickness and the spring contact is fabricated form a second piece of material (e.g., stainless steel) having a second thickness less than the first thickness. As a result, the terminal frame provides more rigidity as compared with the spring contact, as desired.

Figure 1A:
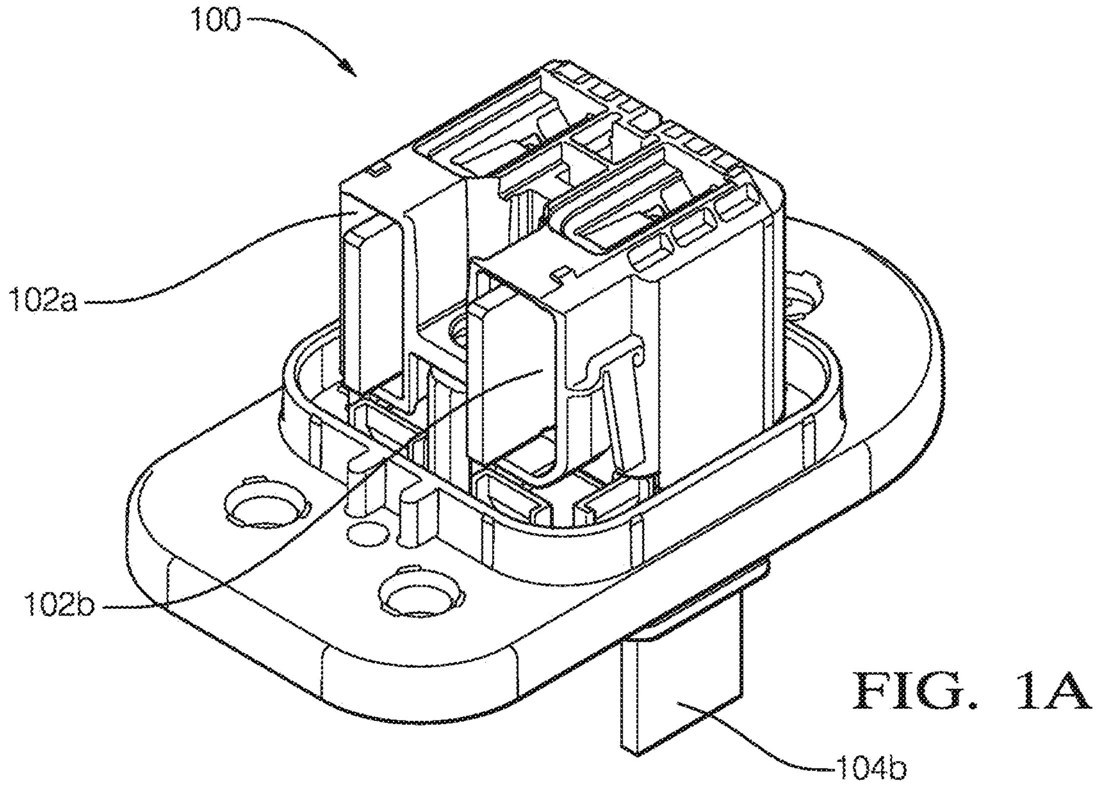
FIG. 1A is an isometric view of a high voltage (HV) terminal assembly according to some embodiments.
Figure 1B:
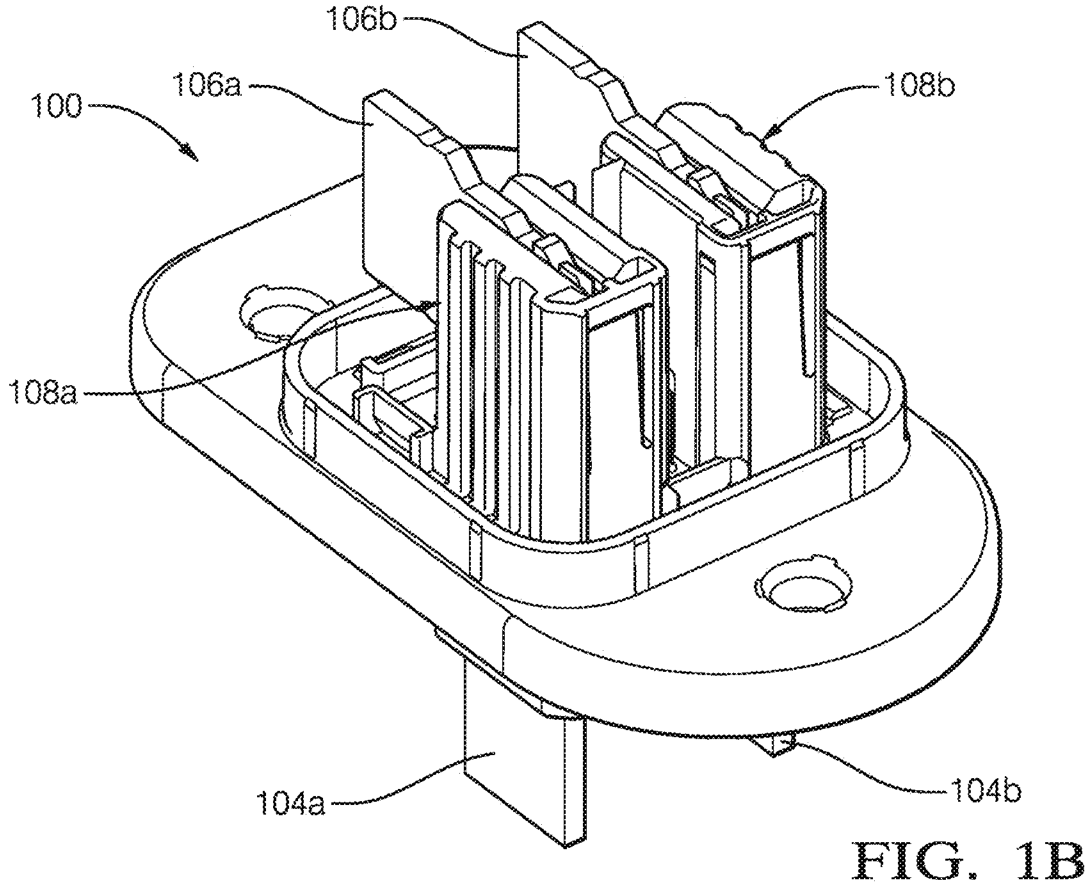
FIG. 1B is an isometric view of a high voltage (HV) terminal assembly with an outer covering removed illustrate a high voltage (HV) terminal frame according to some embodiments.

Referring now to FIGS. 1A-1B, a HV terminal assembly 100 is provided that utilizes a pair of header assemblies 108*a*, 108*b*. In this example, the HV terminal assembly 100 is a right-angle assembly. Terminal ports 102*a*, 102*b* are configured to receive a corresponding terminal (not shown) in a first longitudinal or horizontal direction. Conductive bus bars 104*a*, 104*b* (referred to as a connector side bus bar) extends in a vertical direction at a right-angle to the direction of connection associated with the terminal ports 102*a*, 102*b*.

In the embodiment shown in FIG. 1B, a portion of the housing associated with the HV terminal assembly 100 is removed to expose the header assemblies 108*a*, 108*b*. In this embodiment, a connector side bus bar 106*a*, 106*b* extends longitudinally from the header assemblies 108*a*, 108*b*, respectively. Likewise, the header side bus bars 104*a*, 104*b* extend in a downward direction from the header assemblies 108*a*, 108*b*. As described in more detail below, in some embodiments the header side bus bars 104*a*, 104*b* are pass through bus bars that do not require crimping of the bus bars to the header assemblies 108*a*, 108*b*, respective. In some embodiments, the connector side bus bar 106*a*, 106*b* is slid downward into the header assemblies 108*a*, 108*b*, respectively, and is pressed into contact with the header side bus bars 104*a*, 104*b*, respectively, by contact springs (126, shown in FIGS. 3A and 3B).

Referring now to FIGS. 2 through 4B, various views of the header assemblies 108*a*, 108*b* and terminal assemblies 114*a*, 114*b* (collectively, terminal assembly 114) housed within the respective header assemblies 108*a*, 108*b* are provided. In some embodiments, each terminal assembly 114 is a two-piece assembly, including a terminal frame 116 and a contact spring 118, described in more detail with respect to FIGS. 3A and 3B.

Figure 2:
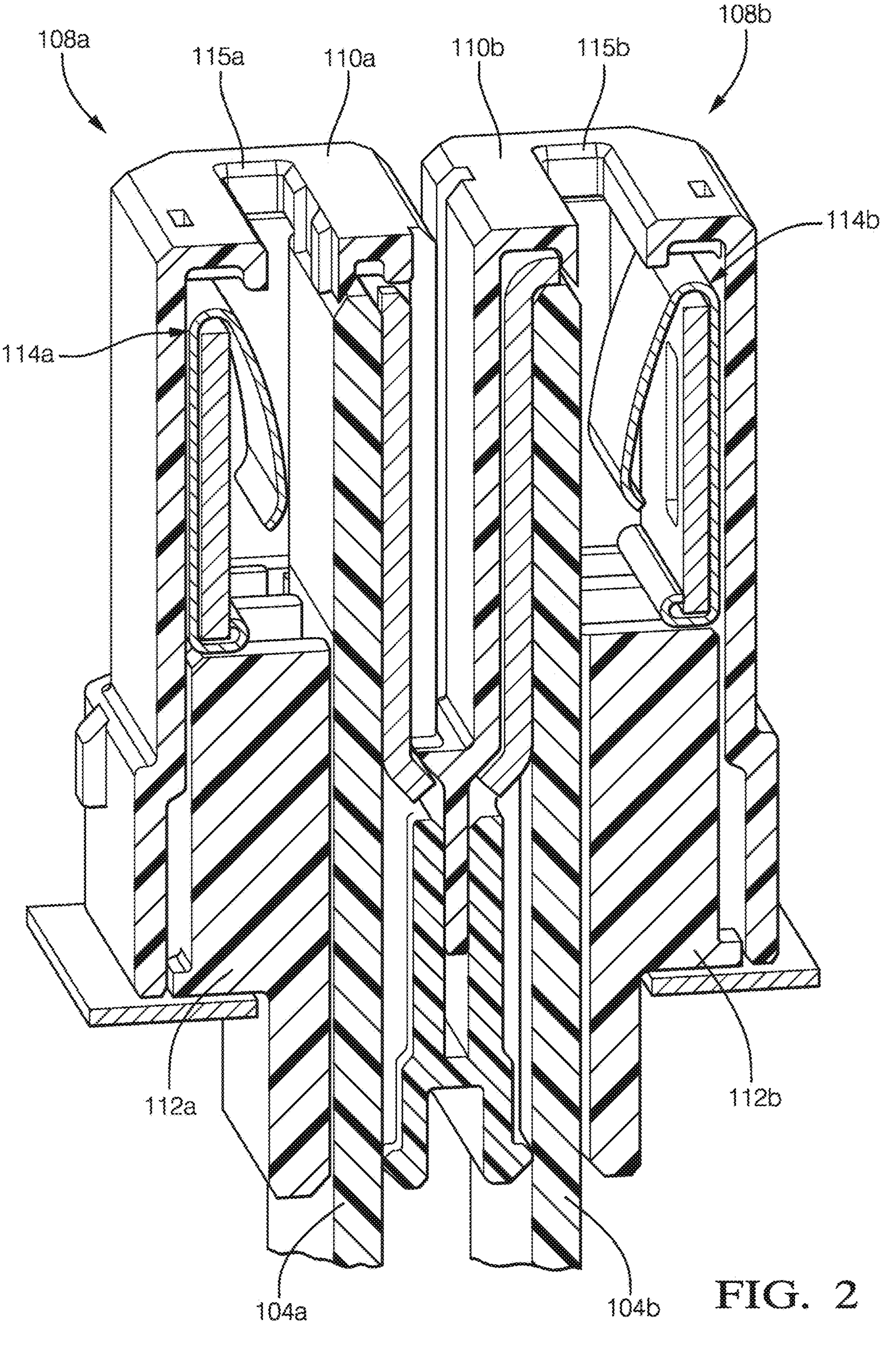
FIG. 2 is a cross-sectional view of a header assembly associated with the HV terminal assembly according to some embodiments.

In the embodiment shown in FIG. 2, header assembly 108*a* includes a housing assembly 110*a*, terminal assembly 114*a*, and terminal position assurance (TPA) 112*a*. Referring to header assembly 108*a*, terminal assembly 114*a* is located within housing assembly 110*a*. In the embodiment shown in FIG. 2, header side bus bar 104*a* is positioned within housing assembly 110*a* and is retained by terminal assembly

114*a*. An opening or port 115*a* is configured to receive the connector side bus bar 106*a* (shown in FIG. 1A), which is retained in place by terminal assembly 114*a*. In particular, as described with respect to FIGS. 3A and 3B, the contact spring 118 is configured to exert a normal force on the connector side bus bar 106*a* that urges the connector side bus bar 106*a* into contact with the header side bus bar 104*a*. In some embodiments, TPA 112*a* is configured to be placed within the housing assembly 110*a*, which engages with terminal assembly 114*a* within housing assembly 110*a*. In some embodiments, TPA 112*a* includes a lock feature (not shown) that engages with the housing assembly 110*a* to lock the TPA 112*a* into place within the housing assembly 110*a*. Likewise, the header assembly 108*b* includes a housing assembly 110*b*, terminal assembly 114*b*, and terminal position assurance (TPA) 112*b*.

Figure 3A:
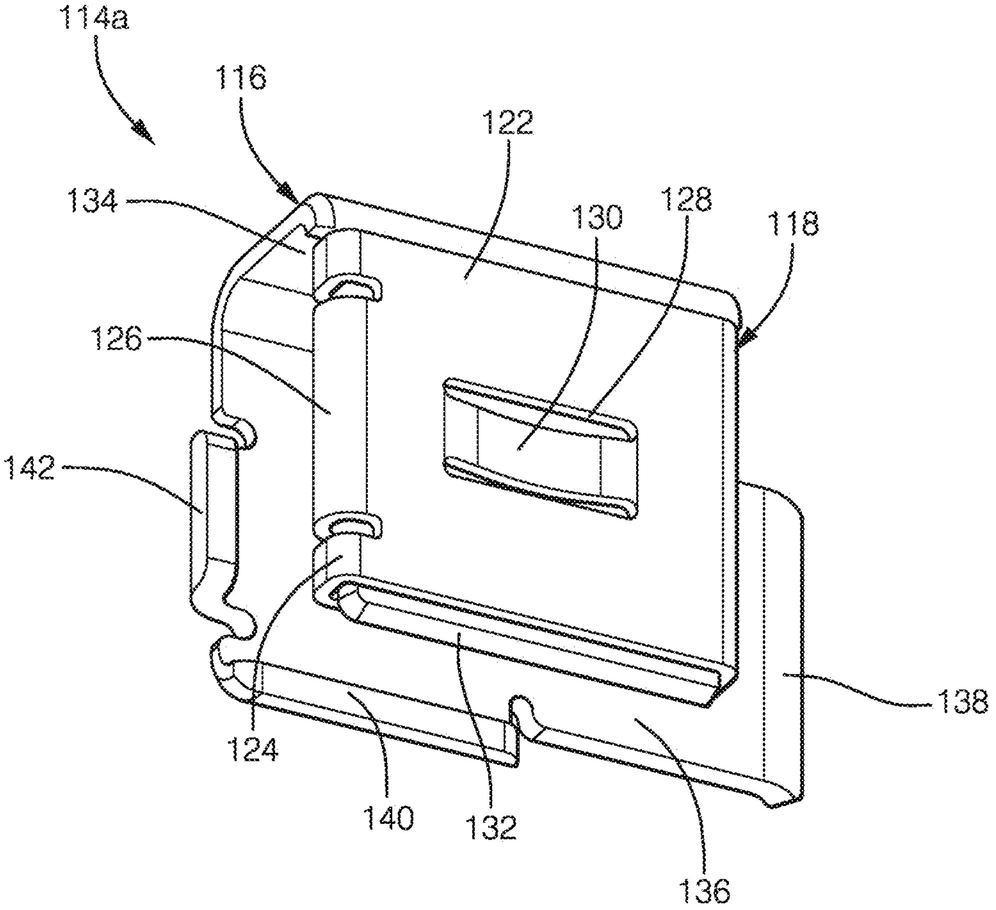
FIG. 3A is an isometric view of a terminal assembly with installed spring contact according to some embodiments.
Figure 3B:
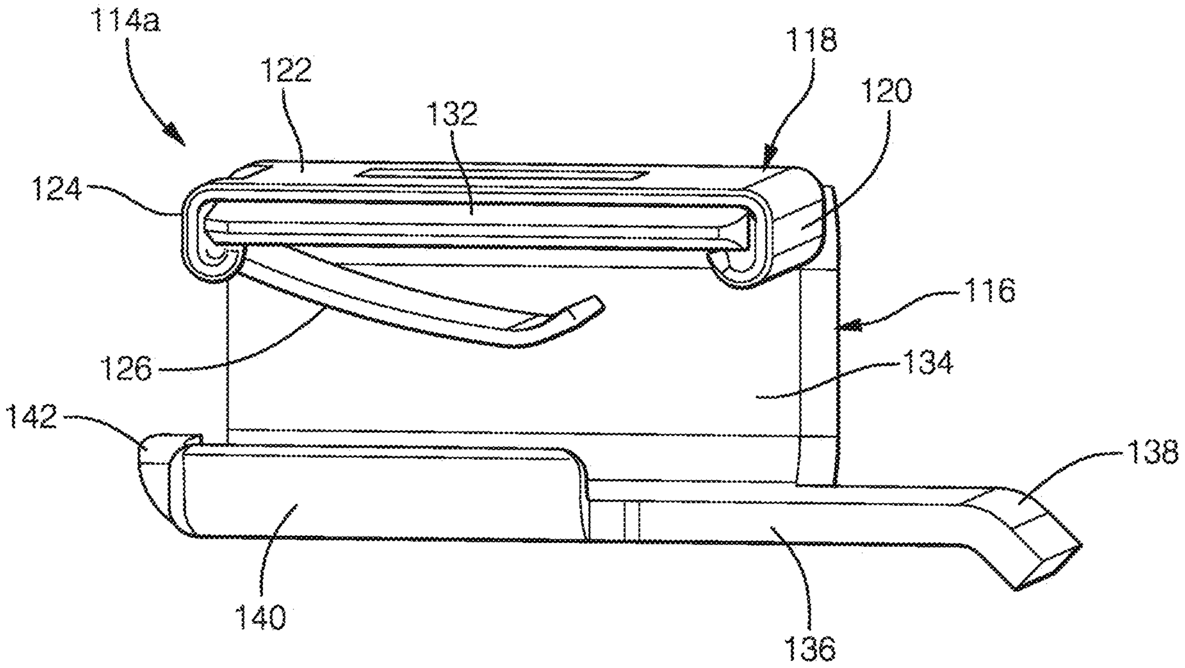
FIG. 3B is a side view of the terminal assembly with installed spring contact according to some embodiments.

FIGS. 3A and 3B illustrate the terminal assembly 114*a*, which is a two-piece assembly that includes terminal frame 116 and contact spring 118. Terminal assembly 114*a* includes an opening. The spring portion 126 of contact spring 118 extends into the opening, wherein the opening is configured to receive header side bus bar 104*a* and connector side bus bar 106*a* (as shown in FIGS. 1A and 1B). As described above, the spring portion 126 of contact spring 118 is brought into contact with the connector side bus bar 106*a* and urges the connector side bus bar 106*a* into contact with the header side bus bar 104*a* (as shown in more detail in FIGS. 4A and 4B).

In some embodiments, terminal frame 116 is fabricated from a single piece of material having a first uniform thickness folded into the desired shape. In some embodiments, contact spring 118 is fabricated from a single piece of material having a second uniform thickness folded into a desired shape, wherein the second thickness is less than the first thickness. One benefit of a two-piece terminal assembly wherein the thickness of the material forming the terminal frame 116 is greater than the thickness of the material forming the contact spring 118 is the greater thickness of the terminal frame 116 provides improved rigidity as compared with the contact spring 118. Likewise, the contact spring 118—and in particular the spring portion 126—is more flexible due to the thickness of the contact spring. In some embodiments, the terminal frame 116 and the contact spring 118 are fabricated from the same material (e.g., stainless steel), wherein characteristics such as rigidity of the terminal frame 116 and the contact spring 118 are selected based on the thickness of the respective components. In other embodiments, the terminal frame 116 and the contact spring 118 may be fabricated using different materials. For example, the terminal frame 116 may be fabricated from a high carbon steel, wherein the contact spring 118 may be fabricated from stainless steel. In some embodiments, the terminal frame 116 is "C-shaped" and includes a top portion 132, a middle portion 134, and a bottom portion 136, wherein the top portion 132 and the bottom portion 136 are parallel to one another. The middle portion 134 is transverse to the top portion 132 and the bottom portion 136 and connects the top portion 132 and the bottom portion 136. The top portion 132, the middle portion 134 and the bottom portion 136 form the opening configured to receive the connector side bus bar 106 and the header side bus bar 104. In some embodiments, the top portion 132 is configured to receive and capture the contact spring 118, wherein the spring portion 126 extends into the opening and is configured to exert a normal force on the connector side bus bar 106 to urge the connector side bus bar 106 into contact with the header side bus bar 104. In some embodiments, the bottom portion 136 of the terminal frame 116 includes a stop feature 142, a front guide feature 138 and a side guide feature 140. The stop feature 142 defines the maximum extent the header side bus bar 104 can extend into the terminal frame 116. The side guide feature 140 and the front guide feature 138 aid in guiding the header side bus bar 104 into the opening of the terminal frame 116. In addition, the front guide feature 138 interacts with an overlapping feature 150 (shown in FIGS. 4A and 4B) of the TPA 112*a* to ensure the terminal frame 116 is properly positioned within the housing 110.

In some embodiments, contact spring 118 is also "C-shaped" having a first portion 120, a middle portion 122 and a second portion 124. The first portion 120 and the second portion 124 are configured to engage with the terminal frame 116, wherein the spring portion 126 extends into an opening provided within the terminal assembly 114*a*. As shown in FIG. 3B, the first portion 120 and the second portion 124 wrap around the top portion 132 of terminal frame 116, and prevent the contact spring 118 from moving forward or backward relative to the terminal frame 116. In some embodiment, contact spring 118 also includes a cut-out portion 128 located within the middle portion 122 and a spring 130 formed within the cut-out portion 128. In some embodiments, the spring 130 bends or flexes toward the terminal frame 116. During installation of the contact spring 118 onto the terminal frame 116—which requires sliding the contact spring 118 over the terminal frame 116—the spring 130 bends or flexes against the top surface of the terminal frame 116. A groove or channel (not shown) formed on the top surface of the terminal frame 116 is configured to receive and capture the spring 130 when the contact spring 118 is fully engaged with the terminal frame 116. The engagement of the spring 130 with the groove or channel (not shown) of the terminal frame 116 prevents the contact spring 118 from sliding relative to the terminal frame 116.

Figure 4A:
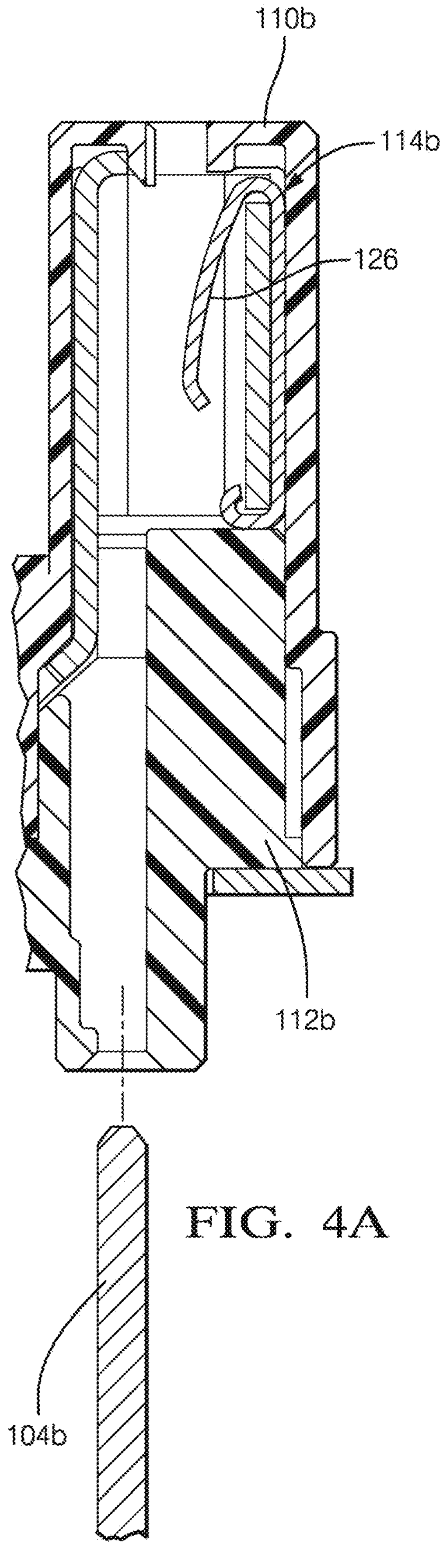
FIG. 4A is a cross-sectional view of a header assembly positioned to receive a header side bus bar according to some embodiments.
Figure 4B:
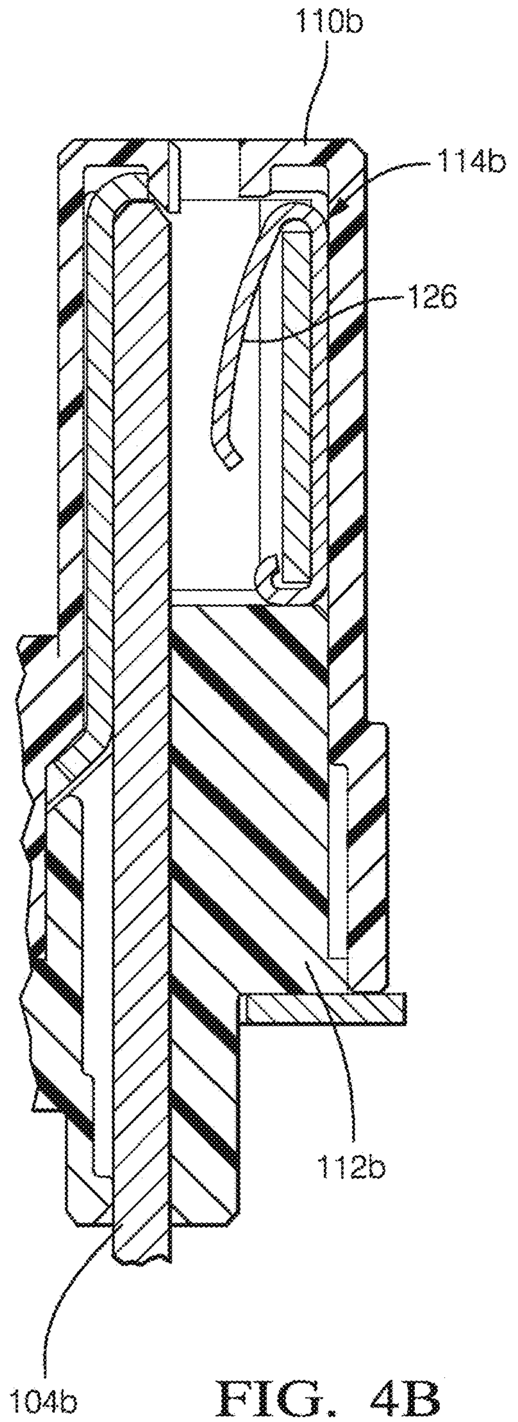
FIG. 4B is a cross-sectional view of the header assembly that includes the header side bus bar in the installed position according to some embodiments.

FIGS. 4A and 4B are cross-sectional views that illustrate insertion of a header side bus bar 104*b* into the header assembly 108*b*. As shown in FIG. 4A, the contact spring 118 is installed on the terminal frame 116, and the terminal assembly 114*b* is installed within the housing assembly 110*b*. In some embodiments, TPA 112*b* is installed within the housing assembly 110*b* and pushed into engagement with the terminal frame 116 to ensure the terminal frame 116 is properly positioned (e.g., seated) within the housing assembly 110*b*. In some embodiments, an overlapping feature 152 associated with the TPA 112*b* engages with the front guide feature 138 of the terminal frame 116 to ensure terminal frame 116 is properly positioned/seated within the housing assembly 110*b*. In some embodiments, TPA 112*b* includes a locking feature (not shown) that engages with the housing assembly 110*b* to ensure the TPA 112*b* (as well as terminal assembly 114*b*) is properly positioned/seated within the housing assembly 110*b*.

Having inserted the terminal assembly 114*b* and the TPA 112*b* within the housing assembly 110*b*, the header side bus bar 104*b* is inserted within the header assembly 108*b*. In some embodiments, the front guide feature 138 and the side guide feature 140 associated with the terminal frame 116 act to guide the header side bus bar 104*b* into place within the terminal frame 116. Likewise, the stop feature 142 associated with the terminal frame 116 is configured to receive the header side bus bar 104*b*. Having positioned the header side bus bar 104*b* within the header assembly 108*b*, a connector side bus bar 106*b* may be inserted into the opening 115*b* on the header assembly 108*b*. Once inserted, the connector side bus bar 106*b* interacts with and compresses spring portion 126 of contact spring 118. The compression of the spring portion 126 generates a normal force on the connector side bus bar 106*b* that presses the connector side bus bar 106*b* into contact with the header side bus bar 104*b*.

Figure 5A:
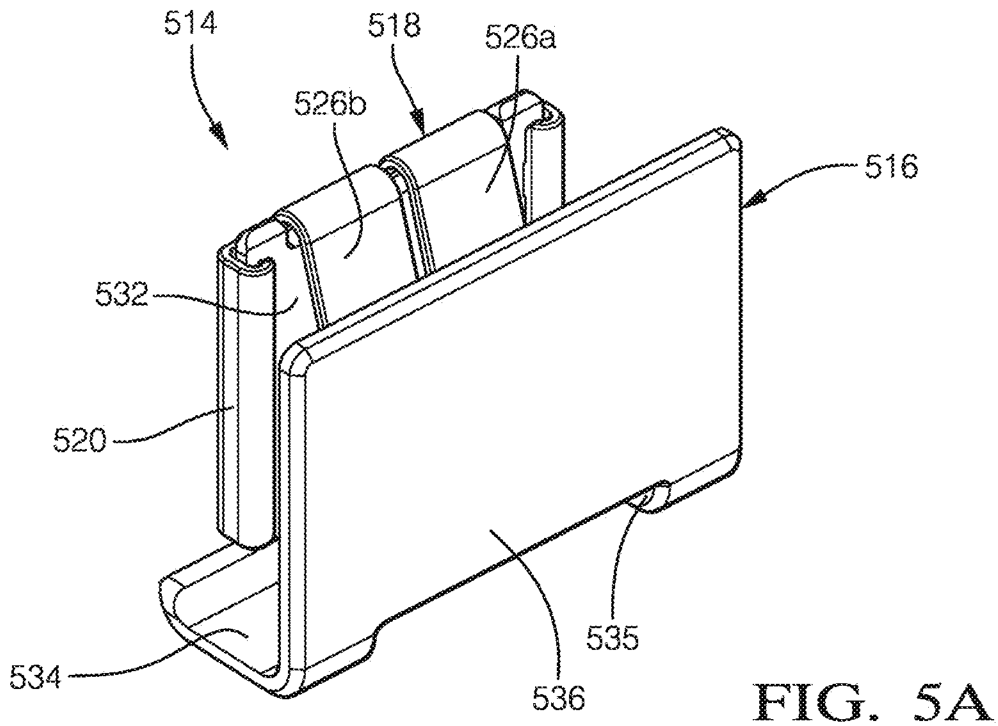
FIGS. 5A and 5B are isometric views of a bi-directional pass-thru terminal assembly according to some embodiments.
Figure 5B:
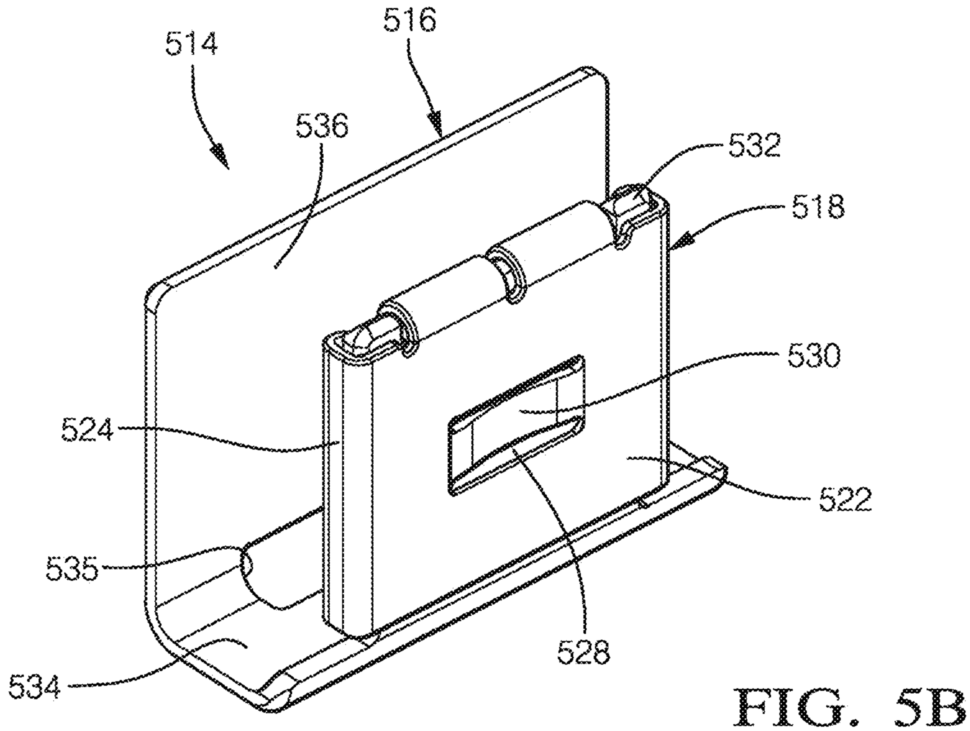

FIGS. 5A and 5B illustrate the terminal assembly 514, which is a two-piece assembly that includes terminal frame 516 and contact spring 518. Terminal assembly 514 includes an opening for receiving connector side bus bars 606*a* and 606*b* (shown in FIG. 6). Typically, terminal assembly 514 is configured to receive one of connector side bus bar 606*a* or 606*b*, not both simultaneously. In some embodiments, the contact spring 518 includes first spring portion 526*a* and second spring portion 526*b* that each extend into the opening of the terminal assembly 514. As described above, at least one of the spring portions 526*a* and 526*b* of contact spring 518 is brought into contact with one of the respective connector side bus bars 606*a* and/or 606*b* and urges the particular connector side bus bar 606*a* and/or 606*b* into contact with the header side bus bar 604 (as shown in more detail in FIGS. 6 and 7). A benefit of this design is that the header assembly 608 (shown in FIG. 6) may receive connector side bus bars from more than one direction, making the header assembly 608 capable of use in different applications requiring different orientations of the connector side bus bar.

In some embodiments, terminal frame 516 is fabricated from a single piece of material having a first uniform thickness folded into the desired shape. In some embodiments, contact spring 518 is fabricated from a single piece of material having a second uniform thickness folded into a desired shape, wherein the second thickness is less than the first thickness. One benefit of a two-piece terminal assembly wherein the thickness of the material forming the terminal frame 516 is greater than the thickness of the material forming the contact spring 518 is the greater thickness of the terminal frame 516 provides improved rigidity as compared with the contact spring 518. Likewise, the contact spring 518—and in particular the spring portions 526*a* and 526*b*—is more flexible due to the thickness of the contact spring. In some embodiments, the terminal frame 516 and the contact spring 518 are fabricated from the same material (e.g., stainless steel), wherein characteristics such as rigidity of the terminal frame 516 and the contact spring 518 are selected based on the thickness of the respective components. In other embodiments, the terminal frame 516 and the contact spring 518 may be fabricated using different materials. For example, the terminal frame 516 may be fabricated from a high carbon steel, wherein the contact spring 518 may be fabricated from stainless steel. In some embodiments, the terminal frame 516 is "C-shaped" and includes a top portion 532, a middle portion 534, and a bottom portion 536, wherein the top portion 532 and the bottom portion 536 are parallel to one another. The middle portion 534 is transverse to the top portion 532 and the bottom portion 536 and connects the top portion 532 and the bottom portion 536. The top portion 532, the middle portion 534 and the bottom portion 536 form the opening configured to receive one or both of the connector side bus bars 606*a* and 606*b* and the header side bus bar 604 (shown in FIGS. 6 and 7). In some embodiments, the terminal frame 516 includes an aperture 535 formed along the bottom portion 536 that is configured to receive the header side bus bar 604 (shown in FIGS. 6 and 7). In the embodiments shown in FIGS. 2-4B, the header assembly is uni-directional in that the connector side bus bar is affixed to the header assembly 108 from only a single direction. As a result of being uni-directional, the terminal frame 116 is oriented such that the opening of the terminal frame 116 accepts both the connector side bus bar 106 and the header side bus bar 104. In contrast, the terminal frame 516 in the bi-directional design shown in FIGS. 5A, 5B, 6, and 7 is oriented to allow bi-directional connection of connector side bus bars 606*a* and 606*b*. The terminal frame 516 includes aperture 535 to allow the header side bus bar 604 to be positioned within the terminal frame 516.

In some embodiments, the top portion 532 is configured to receive and capture the contact spring 518, wherein the spring portions 526*a* and 526*b* extend into the opening and are configured to exert a normal force on the connector side bus bars 606*a* and 606*b*, respectively, to urge the respective connector side bus bars 606*a* and 606*b* into contact with the header side bus bar 604. In some embodiments, the contact spring 518 includes only a single spring portion 526 rather than two sprint portions 526*a*, 526*b*. That is, in some embodiments regardless of the direction of the connector side bus bar 606 the single sprint portion 526 is brought into contact with the connector side bus bar 606. In some embodiments, the bottom portion 636 of the terminal frame 616 may include a stop feature (not shown), a front guide feature (not shown) and a side guide feature (not shown) similar to that described with respect to FIGS. 3A and 3B.

In some embodiments, contact spring 518 is also "C-shaped" having a first portion 520, a middle portion 522 and a second portion 524. The first portion 520 and the second portion 524 are configured to engage with the terminal frame 516 and in particular with the top portion 532 of the terminal frame 516. In some embodiments, the spring portions 526*a*, 526*b* extends into an opening provided within the terminal assembly 514. As described above, in some embodiments only a single spring portion 526 is utilized rather than two separate spring portions 526*a*, 526*b*. As shown in FIGS. 5A and 5B, the first portion 520 and the second portion 524 wrap around the top portion 532 of terminal frame 516, and prevent the contact spring 518 from moving forward or backward relative to the terminal frame 516. In some embodiment, contact spring 518 also includes a cut-out portion 528 located within the middle portion 522 and a spring 530 formed within the cut-out portion 528. In some embodiments, the spring 530 bends or flexes toward the terminal frame 516. During installation of the contact spring 518 onto the terminal frame 516—which requires sliding the contact spring 518 over the terminal frame 516—the spring 530 bends or flexes against the top surface 532 of the terminal frame 516. A groove or channel (not shown) formed on the top surface 532 of the terminal frame 516 is configured to receive and capture the spring 530 when the contact spring 518 is fully engaged with the terminal frame 516. The engagement of the spring 530 with the groove or channel (not shown) of the terminal frame 516 prevents the contact spring 518 from sliding relative to the terminal frame 516.

In some embodiments, terminal frame 516 is configured for use in a bi-directional HV terminal assembly, in which connector side bus bars 606*a* and 606*b* may be positioned from either side of the HV terminal assembly. To accommodate connector side bus bars 606*a* and 606*b* extending in either direction from the terminal frame 516, the spring portions 526*a* and 526*b* are configured to extend toward the middle portion 534 of the terminal frame 516. The orientation of the spring portions 526*a* and 526*b* within the opening of the terminal frame 516 allows the connector side bus bars 606*a* and 606*b* to be inserted vertically (i.e., from the top) into the terminal frame 516 (as shown in FIGS. 6 and 7).

Figure 6:
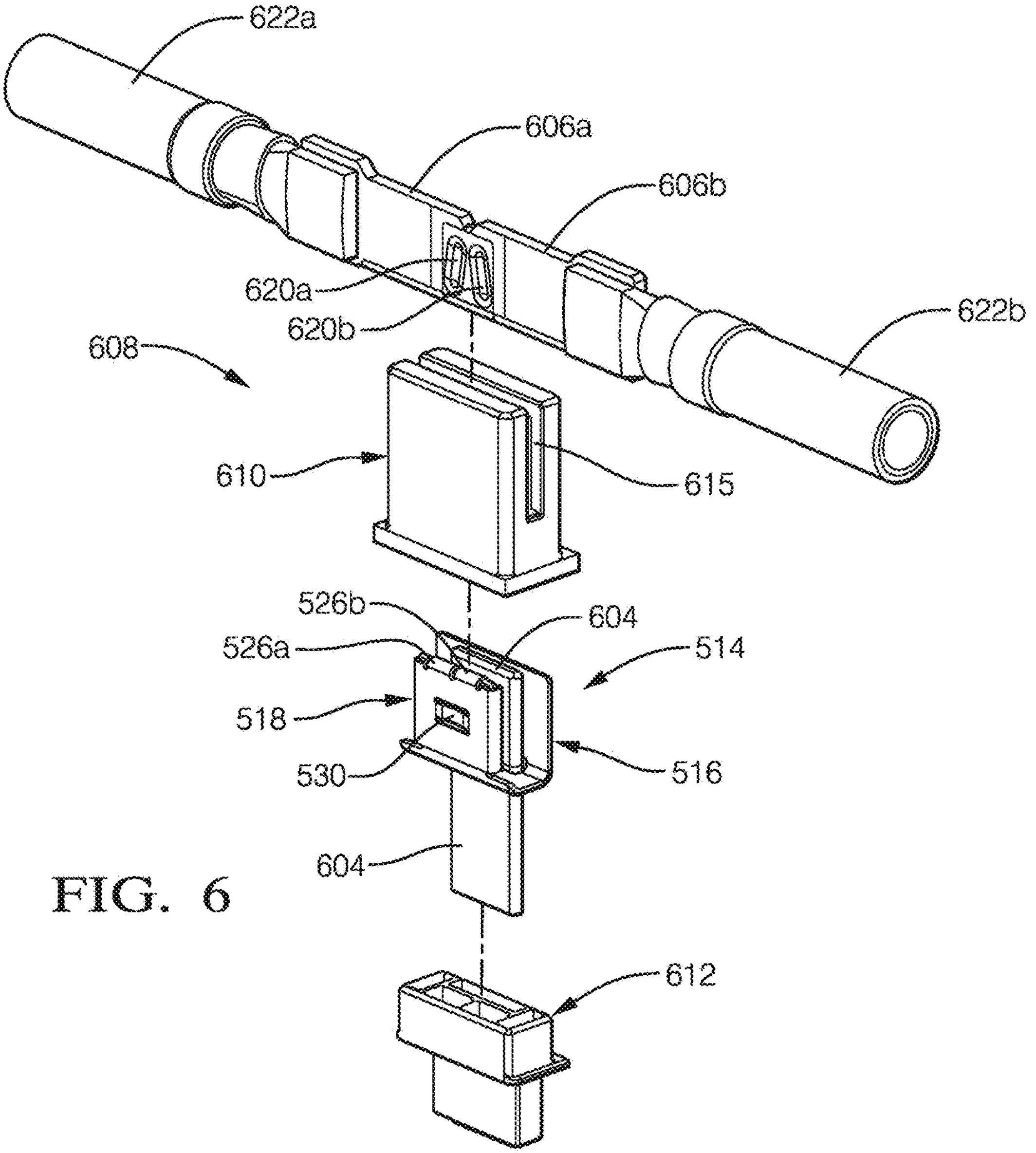
FIG. 6 is an exploded view of a bi-directional pass-thru header assembly that utilizes the bi-directional pass-thru terminal assembly shown in FIGS. 5A and 5B according to some embodiments.
Figure 7:
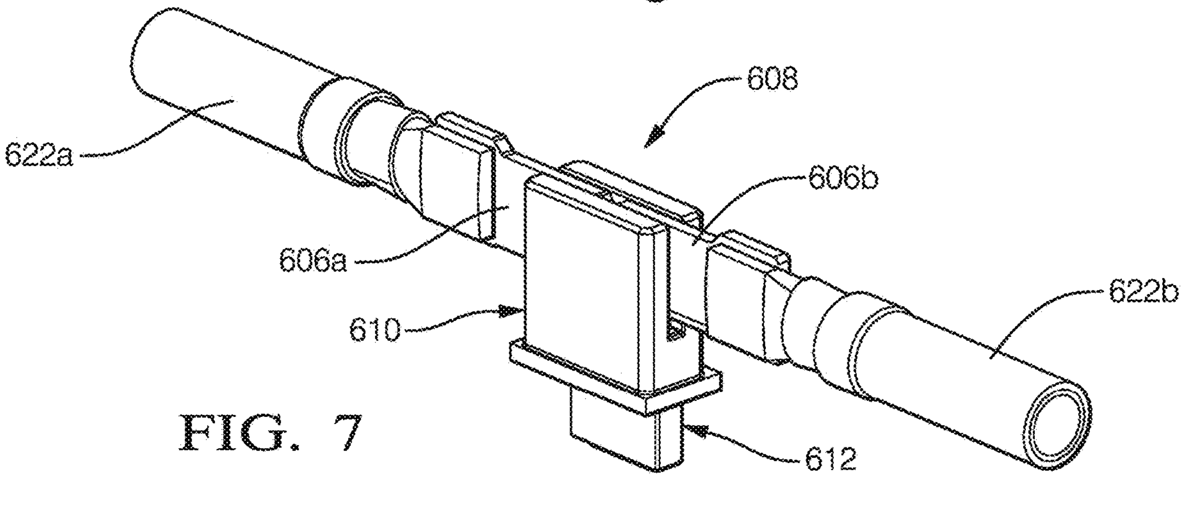
FIG. 7 is an isometric view of a bi-directional pass-thru header assembly according to some embodiments.

Referring now to FIGS. 6 and 7, exploded and assembly views of the bi-directional header assembly 608 are provided. The exploded view shown in FIG. 6 illustrates assembly of the housing 610, the terminal assembly 514 and the terminal retainer 612 as part of the bi-directional header assembly 608, with the assembled version shown in FIG. 7. As shown in FIG. 6, the contact spring 518 is installed on the terminal frame 516, and the terminal assembly 514 is installed within the housing assembly 610. In some embodiments, terminal retainer 612 is installed within the housing assembly 610 and pushed into engagement with the terminal frame 516 to ensure the terminal frame 516 is properly positioned (e.g., seated) within the housing assembly 610. In some embodiments, an overlapping feature (not shown) associated with the terminal retainer 612 engages with the terminal frame 516 to ensure terminal frame 516 is properly positioned/seated within the housing assembly 610. In some embodiments, terminal retainer 612 includes a locking feature (not shown) that engages with the housing assembly 610 to ensure the terminal retainer 612 (as well as terminal assembly 514) is properly positioned/seated within the housing assembly 610. In some embodiments, the terminal frame 516 is retained in place by the terminal retainer 612, wherein the terminal frame 516 does not require features to retain the terminal frame 516 within the housing assembly 610.

Having inserted the terminal assembly 514 and the terminal retainer 612 within the housing assembly 610, the header side bus bar 604 is inserted within the header assembly 608. The header side bus bar 604 is inserted from below the header assembly 608 and is inserted through the terminal retainer 612 and into the terminal frame 514. In some embodiments, this allows the header assembly 608 to be mounted over the top of a header side bus bar 604, wherein the header side bus bar 608 is then moved into position within the header assembly 608. In some embodiments, the header side bus bar 604 is retained and locked in place by the terminal retainer 612. In other embodiments, the position of the header side bus bar 604 is maintained by the terminal retainer 612, but is not locked in place by the terminal retainer 612. Having positioned the header side bus bar 604 within the header assembly 608, connector side bus bars **606*a* and 606*b* may be inserted into the opening 615 on the header assembly 608. In some embodiments, connector side bus bar 606*a* is provided from a first direction and connector side bus bar 606*b* is provided from a second direction opposite the first. In this way, the header assembly 608 is bi-directional. In some embodiments, the insertion of the connector side bus bar 606*a* into the opening 615 causes compression of the spring portion 526*a*, which in response generates a normal force on the connector side bus bar 606*a* that presses the connector side bus bar 606*a* into contact with the header side bus bar 604. Likewise, the insertion of the connector side bus bar 606*b* into the opening 615 causes compression of the spring portion 526*b*, which in response generates a normal force on the connector side bus bar 606*b* that presses the connector side bus bar 606*b* into contact with the header side bus bar 604. In some embodiments, connector side bus bars 606*a* and 606*b* include indentations 620*a* and 620*b*, respectively, for receiving the spring portions 526*a* and 526*b*, respectively. Engagement of the indentations 620*a* and 620*b* with the spring portions 526*a* and 526*b* prevents the connector side bus bars 606*a* and 606*b* from moving within the header assembly 608**.

In contrast with the header assembly 108 shown in FIG. 2 in which the terminal assembly 114 is oriented to only allow the connector side bus bar to extend away in a single direction, the terminal assembly 514 shown in FIGS. 6 and 7 are oriented to allow connector side bus bars **606*a* and 606*b* to extend bi-directionally from the header assembly 608. As shown in FIG. 7, wires 622*a* and 622*b* and corresponding connector side bus bars 606*a* and 606*b*, respectively, extend in opposite directions from the header assembly 608**.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A header assembly comprising:

a housing assembly having a first opening;

a two-piece terminal assembly positioned within the housing assembly, the two-piece terminal assembly including a terminal frame and a contact spring engaged with the terminal frame; and a terminal position assurance (TPA) positioned within the housing assembly adjacent to the two-piece terminal assembly;

wherein the first opening of the housing assembly is aligned with an opening defined by the terminal frame such that a first bus bar inserted through the first opening is received in the opening of the terminal frame, and wherein the header assembly is configured for selective bi-directional connection of the first bus bar and wherein the selective bi-directional connection includes: a first connection in which the first bus bar is insertable through the first opening of the housing assembly such that the first bus bar extends in a first direction from the header assembly; and a second connection in which the first bus bar is insertable through the first opening of the housing assembly such that the first bus bar extends in a second direction from the header assembly.

2. The header assembly of claim 1, wherein the terminal frame is fabricated from a first material having a first uniform thickness and the contact spring is fabricated from a second material having a second uniform thickness, wherein the second thickness is less than the first thickness.

3. The header assembly of claim 1, wherein the terminal frame is fabricated from a first material and the contact spring is fabricated from a second material.

4. The header assembly of claim 3, wherein the first material and the second material are dissimilar.

5. The header assembly of claim 3, wherein the first material and the second material are stainless steel.

6. The header assembly of claim 1, wherein the terminal frame includes at least a top portion, a bottom portion, and a middle portion, wherein an opening configured to receive the first bus bar is defined by the top, bottom and middle portions; and wherein the contact spring is C-shaped and includes a first portion, a middle portion and a second portion, wherein the first portion and the second portion are configured to wrap around opposite ends of the top portion of the terminal frame to prevent movement in a forward and backward direction.

7. The header assembly of claim 6, wherein the contact spring includes a cut-out formed in the middle portion and a spring extending across the cut-out, wherein the spring is bent to contact the top portion of the terminal frame.

8. The header assembly of claim 7, wherein the top portion of the terminal frame includes a groove configured to the receive the spring extending across the cut-out, wherein engagement of the spring within the groove prevents movement of the contact spring along a direction the contact spring is slid over the top portion of the terminal frame.

9. The header assembly of claim 1, wherein the terminal frame includes at least a top portion, a bottom portion, and a middle portion, wherein the middle portion of the terminal frame includes an aperture configured to receive a header side bus bar.

10. The header assembly of claim 9, wherein the contact spring includes a first spring portion and a second spring portion located adjacent to the first spring portion, wherein both the first spring portion and the second spring portion extend into the opening of the terminal frame, wherein the first spring portion is configured to contact the first bus bar oriented in a first orientation and the second spring portion is configured to contact the first bus bar oriented in a second orientation opposite the first orientation.

11. The header assembly of claim 10, wherein the first bus bar is received within the first opening of the housing assembly from a vertical direction.

12. The header assembly of claim 10, wherein the first bus bar includes an indentation, wherein the first spring portion or the second spring portion is received within the indentation.

13. A header assembly comprising:

a housing assembly having at least a first opening for receiving a first bus bar;

a two-piece terminal assembly including a terminal frame and a contact spring engaged with the terminal frame, wherein the two-piece terminal assembly is positioned within the housing assembly and configured to receive a second bus bar; and a terminal position assurance (TPA) placed within the housing assembly and engaging the two-piece terminal assembly within the housing assembly;

wherein:

the terminal frame includes at least a top portion, a bottom portion, and a middle portion forming an opening for receiving at least a first bus bar, wherein the bottom portion of the terminal frame includes a stop feature, a front guide feature and a side guide feature, and the front guide feature interacts with an overlapping feature of the TPA to ensure the terminal frame is properly positioned within the housing; and the contact spring is C-shaped and includes a first portion, a middle portion and a second portion, wherein the first portion and the second portion are configured to wrap around opposite ends of the top portion of the terminal frame to prevent movement in a forward and backward direction.

14. The header assembly of claim 13, wherein the contact spring includes a cut-out formed in the middle portion and a spring extending across the cut-out, wherein the spring is bent to contact the top portion of the terminal frame.

15. The header assembly of claim 13, wherein the terminal frame includes at least a top portion, a bottom portion, and a middle portion, wherein the middle portion of the terminal frame includes an aperture configured to receive the second bus bar.

16. The header assembly of claim 13, wherein the terminal assembly is fabricated from a material with low conductivity.

17. A header assembly comprising:

a housing assembly having at least a first opening for receiving a first bus bar;

a two-piece terminal assembly including a terminal frame and a contact spring engaged with the terminal frame, wherein the two-piece terminal assembly is positioned within the housing assembly and configured to receive a second bus bar; and a terminal position assurance (TPA) placed within the housing assembly and engaging the two-piece terminal assembly within the housing assembly;

wherein:

the contact spring includes a first spring portion and a second spring portion located adjacent to the first spring portion, both the first spring portion and the second spring portion extend into the opening of the terminal frame, and the first spring portion is configured to contact the first bus bar oriented in a first orientation and the second spring portion is configured to contact the first bus bar oriented in a second orientation opposite the first orientation.

* * * * *